June 21, 1927.
G. A. BOUVIER
1,632,875
STRAND HANDLING APPARATUS
Filed Oct. 22, 1924
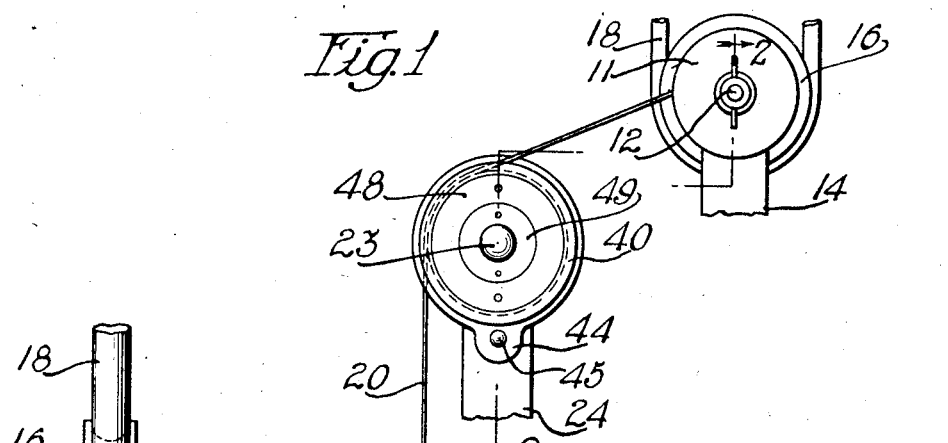
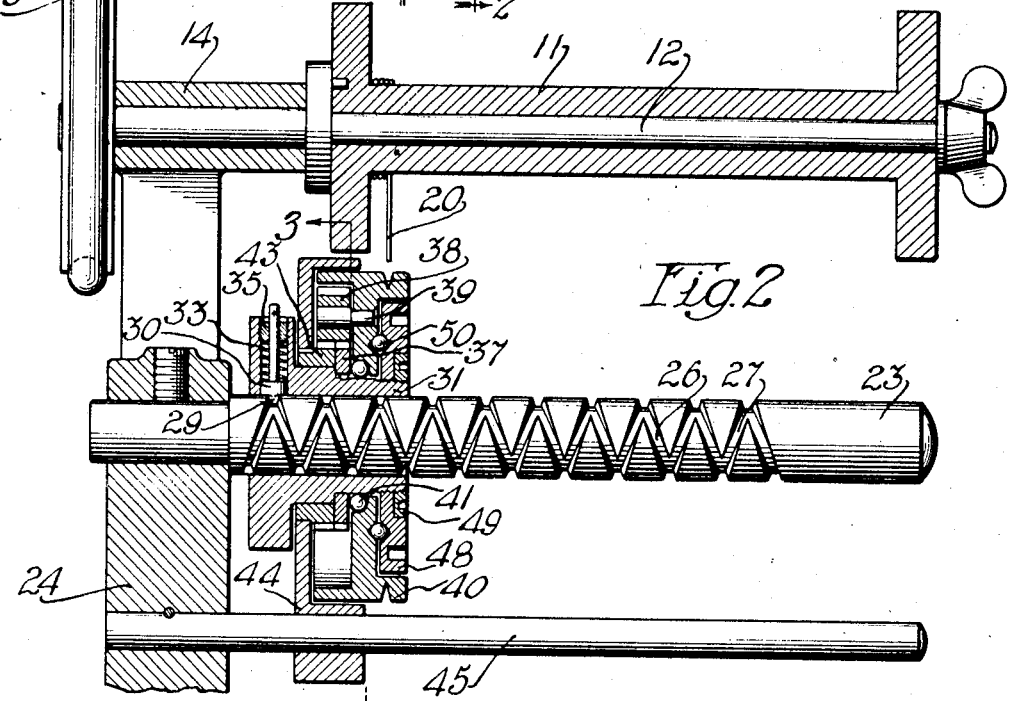
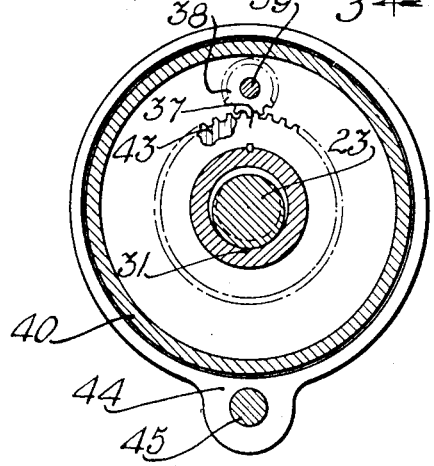
Inventor
George A. Bouvier
by H. A. Mattison Atty.

Patented June 21, 1927.

1,632,875

UNITED STATES PATENT OFFICE.

GEORGE ALFRED BOUVIER, OF OAK PARK, ILLINOIS, ASSIGNOR TO WESTERN ELECTRIC COMPANY, INCORPORATED, OF NEW YORK, N. Y., A CORPORATION OF NEW YORK.

STRAND-HANDLING APPARATUS.

Application filed October 22, 1924. Serial No. 745,095.

This invention relates to strand handling apparatus, and more particularly to apparatus for distributing strand material.

The object of the invention is to provide improved apparatus for distributing material in strand form.

In accordance with the features of the invention, a strand of material is wound upon a core or spool to form superimposed layers thereon. The strand is guided to the spool by mechanism comprising a rotatable sheave which is driven by the strand and is mounted upon and operatively connected to a collar in such manner that it rotates the collar at a reduced speed, the collar being rotatably and slidably mounted on a stud shaft having right and left hand screw threads which are alternately traversed by a lug constrained to rotate with the collar so that the sheave is reciprocated to distribute the strand evenly upon the spool.

Other features of the invention will become apparent as the detailed description progresses, reference being had to the accompanying drawing, wherein Fig. 1 is an end elevation of a portion of a strand spooling apparatus which embodies the invention;

Fig. 2 is a section taken on line 2—2 of Fig. 1, and

Fig. 3 is a section taken on line 3—3 of Fig. 2.

Referring to the drawing, 11 is a spool mounted upon and detachably secured to a spindle 12 which is journaled in a bracket 14 and has secured to it a pulley 16 driven by a belt 18. When rotated, the spool 11 is adapted to wind a strand 20 around itself, the strand being guided onto the spool by an improved distributing mechanism which will now be described in detail.

The distributing mechanism comprises a stud shaft 23 rigidly secured in a bracket 24 and provided with right and left hand screw threads 26 and 27, respectively, which are alternately traversed by a lug 29 when the mechanism is in operation, the threads being so arranged that the lug may pass from either end portion of each thread directly into an end portion of the other. The lug 29 projects from a plunger 30 mounted in a collar 31 which is rotatably and slidably journaled upon the stud shaft 23. The lug 29 is yieldingly held in an operative position with respect to the screw threads 26 and 27 by a compression spring 33 which has one of its ends resting against the plunger 30 and the other of its ends resting against a plug 35 threaded into the collar 31.

Keyed to the collar 31 is a gear 37 which meshes with a pinion 38 journaled on a pin 39 projecting from a sheave 40 which is rotatably journaled upon the collar 31 by a combined thrust and radial ball bearing 41. Also meshing with the pinion 38 is a gear 43 which is keyed to a slide 44 mounted upon a rod 45 projecting from the bracket 24. The sheave 40 and the slide 44 are constrained to move along the stud shaft 23 with the collar 31 by a nut 48 and a lock nut 49 which are threaded upon the collar 31. A thrust bearing 50 interposed between the nut 48 and the sheave 40 cooperates with the ball bearing 41 to permit the sheave to rotate freely upon the collar 31. As best shown in Fig. 1, the strand 20 is trained over the sheave 40, the strand being withdrawn from any suitable supply (not shown) by the spool 11.

In this embodiment of the invention, the number of teeth in the gear 43 is one less than the number of teeth in the gear 37 so that if the pinion 38 is rotated bodily around the axis of the stud shaft 23, the gear 37 will be advanced in the same direction around the stud shaft, but through a relatively small angle. Thus when the apparatus is in operation, the strand 20 will rotate the sheave 40 and cause it to carry the pinion 38 bodily around the stud shaft 23, and the pinion will in turn cause the gear 37 to rotate the collar 31 around the stud shaft, the angle through which the collar is rotated during each revolution of the sheave being equal to the angle subtended by any two adjacent teeth of the gear 37. When the collar 31 is so rotated the lug 29 will alternately traverse the screw threads 26 and 27 and cause the collar 31 to be reciprocated upon the shaft. The arrangement is such that the strand 20 will be evenly distributed in superimposed layers upon the spool 11.

What is claimed is:

1. A mechanism for distributing a strand on a spool as it is wound thereon comprising a member rotated by the strand and having an axis in the same plane as the axis of the spool, means rotated at a different speed by the member, and means for causing displacement of the last mentioned means along its axis when it is so rotated.

2. In combination with means for advancing a strand, mechanism for distributing the strand comprising rotatable means driven by the strand, a second rotatable means carrying the first mentioned rotatable means coaxial therewith and driven thereby at a speed differing therefrom, and means for reciprocating said second rotatable means when it is so rotated.

3. In combination with means for advancing a strand, means actuated by the advancing strand comprising a gear held against rotation, a rotatable gear, and a member driven by the strand cooperating with the rotatable gear and the gear held against rotation, to impart reciprocatory motion to the rotatable gear for distributing the strand.

4. In combination with means for advancing a strand, mechanism for distributing the strand upon its advancement, comprising a member actuated by the advancing strand, a gear held against rotation, and means responsive to said member and cooperating with said gear for distributing the strand.

5. In combination with means for advancing a strand, mechanism for distributing the strand upon its advancement, comprising a gear actuated by the advancing strand, a gear held against rotation, and means responsive to said member and cooperating with said gear for advancing said mechanism longitudinally to distribute the strand in superimposed layers.

6. A mechanism for distributing a strand on a spool as it is wound thereon comprising a guide rod, a strand engaging sheave axially positioned on the guide rod and designed to be rotated by the engaged strand, and means including speed reducing means for utilizing the rotation of the member to reciprocate the same upon the guide rod.

7. A mechanism for distributing a strand on a spool as it is wound thereon comprising a strand engaging guide sheave having an axis parallel to the axis of the spool and designed to be rotated by the engaged strand, and means including speed reducing means utilizing the rotation of the guide sheave to reciprocate the same longitudinally with respect to the spool.

8. A mechanism for distributing a strand on a spool as it is wound thereon comprising a reversing screw, a sheave designed to be rotated by the strand, and speed reducing means including planetary gearing for reciprocating the sheave upon the reversing screw.

In witness whereof, I hereunto subscribe my name this 7th day of Oct. A. D., 1924.

GEORGE ALFRED BOUVIER.